United States Patent
Takeuchi

(10) Patent No.: US 10,059,120 B2
(45) Date of Patent: Aug. 28, 2018

(54) PRINTING CONTROL DEVICE, PRINTING CONTROL METHOD, AND PRINTING CONTROL PROGRAM

(71) Applicant: SEIKO EPSON CORPORATION, Tokyo (JP)

(72) Inventor: Yasutoshi Takeuchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/422,598

(22) Filed: Feb. 2, 2017

(65) Prior Publication Data
US 2017/0225486 A1   Aug. 10, 2017

(30) Foreign Application Priority Data
Feb. 8, 2016   (JP) .................. 2016-021521

(51) Int. Cl.
| | |
|---|---|
| B41J 2/21 | (2006.01) |
| G06K 15/10 | (2006.01) |
| H04N 1/401 | (2006.01) |
| H04N 1/50 | (2006.01) |
| H04N 1/60 | (2006.01) |

(52) U.S. Cl.
CPC .......... B41J 2/2103 (2013.01); G06K 15/105 (2013.01); H04N 1/4015 (2013.01); H04N 1/506 (2013.01); H04N 1/603 (2013.01)

(58) Field of Classification Search
CPC ...... B41J 29/393; B41J 2/2132; B41J 11/008; B41J 2/2103; B41J 29/38; B41J 2/21; B41J 3/543; B41J 2/04501
USPC ........................... 347/5, 6, 9, 14, 15, 19, 43
See application file for complete search history.

(56) References Cited

U.S. PATENT DOCUMENTS

| | | |
|---|---|---|
| 2009/0015611 A1 | 1/2009 | Ochiai et al. |
| 2009/0051721 A1 | 2/2009 | Takahashi et al. |
| 2010/0007901 A1 | 1/2010 | Horii et al. |
| 2010/0165032 A1* | 7/2010 | Yoshida ............... H04N 1/6019 347/15 |
| 2011/0304666 A1 | 12/2011 | Takahashi et al. |

FOREIGN PATENT DOCUMENTS

| | | |
|---|---|---|
| JP | 2009-012390 A | 1/2009 |
| JP | 2009-045835 A | 3/2009 |

OTHER PUBLICATIONS

The Extended European Search Report for the corresponding European Patent Application No. 17155115.3 dated Jun. 9, 2017.

* cited by examiner

*Primary Examiner* — Jannelle M Lebron

(57) ABSTRACT

In S200 after the first halftone, a scanning path is determined. In S205, a printing region to undergo multipass printing is fragmented. In S210, a printing time gap between the first printing time and the second printing time is calculated in the printing position. In S215, the position of the scanning path is associated with information on a color conversion table corresponding to the time gap. In the subsequent second color conversion, the color conversion table for use in color conversion is switched to the color conversion table corresponding to the time gap by using information on the pre-specified position of the scanning path and information on the color conversion table.

8 Claims, 9 Drawing Sheets

PRINTING CONTROL DEVICE, PRINTING CONTROL METHOD, AND PRINTING CONTROL PROGRAM

BACKGROUND

1. Technical Field

The invention relates to a printing control device, a printing control method, and a printing control program, particularly to a printing control device, a printing control method, and a printing control program for performing multipass printing.

2. Related Art

Printing in an ink jet printer is performed by moving an ink head bidirectionally with a carriage. During bidirectional printing, multipass printing may be performed by scanning a target region more than once. In multipass printing in general, first (outward) printing and then second (inward) printing are performed. A time gap between these printing operations is hereinafter called a between-pass time gap. Printing involving a between-pass time gap tends to provide darker print than printing involving no between-pass time gap.

The technique described in JP-A-2009-45835 divides an area within which the ink head is moved by the carriage into a plurality of regions to reduce the amount of ink jetted on each region and thus prevent the print from becoming dark.

The technique described in JP-A-2009-45835 uniformly reduces the amount of jetted ink to suppress a change in concentration due to a between-pass time gap, although a reduction in the amount of jetted ink alone cannot suppress color change.

SUMMARY

An advantage of some aspects of the invention is to suppress color change in multipass printing involving a between-pass time gap.

According to an aspect of the invention, a printing control device that causes a printing device including a printing head linearly crossing over a print medium to perform multipass printing by scanning a region more than once, includes: a plurality of color conversion tables; a head motion data acquisition unit that acquires position data on the printing head; and a color conversion unit that uses, in multipass printing, the position data on the printing head to select one or more of the color conversion tables to be used for color conversion and perform color conversion.

It is preferable that the head motion data acquisition unit acquire a scanning path of the printing head and the position data in multipass printing and the color conversion unit select one or more of the color conversion tables to be used for color conversion on the basis of the scanning path of the printing head and the position data.

It is preferable that the color conversion unit use the scanning path of the printing head and the position data to determine time gaps for printing between different scanning operations in multipass printing, and use the time gaps to select one or more of the color conversion tables to be used for color conversion.

A plurality of color conversion tables is provided and, in multipass printing, the position data on the printing head is used to select one or more of the color conversion tables to be used for color conversion and color conversion is performed. Since the plurality of color conversion tables is used to suppress color change, color change in multipass printing can be suppressed.

A scanning path of the printing head and the position data in multipass printing may be acquired and the color conversion table to be used for color conversion may be selected on the basis of the scanning path and the position data, thereby selecting a color conversion table that can suppress color change.

The scanning path of the printing head and the position data may be used to determine a time gap for printing between different scanning operations in multipass printing, and the time gap may be used to select a color conversion table to be used for color conversion, thereby suppressing color change in multipass printing.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
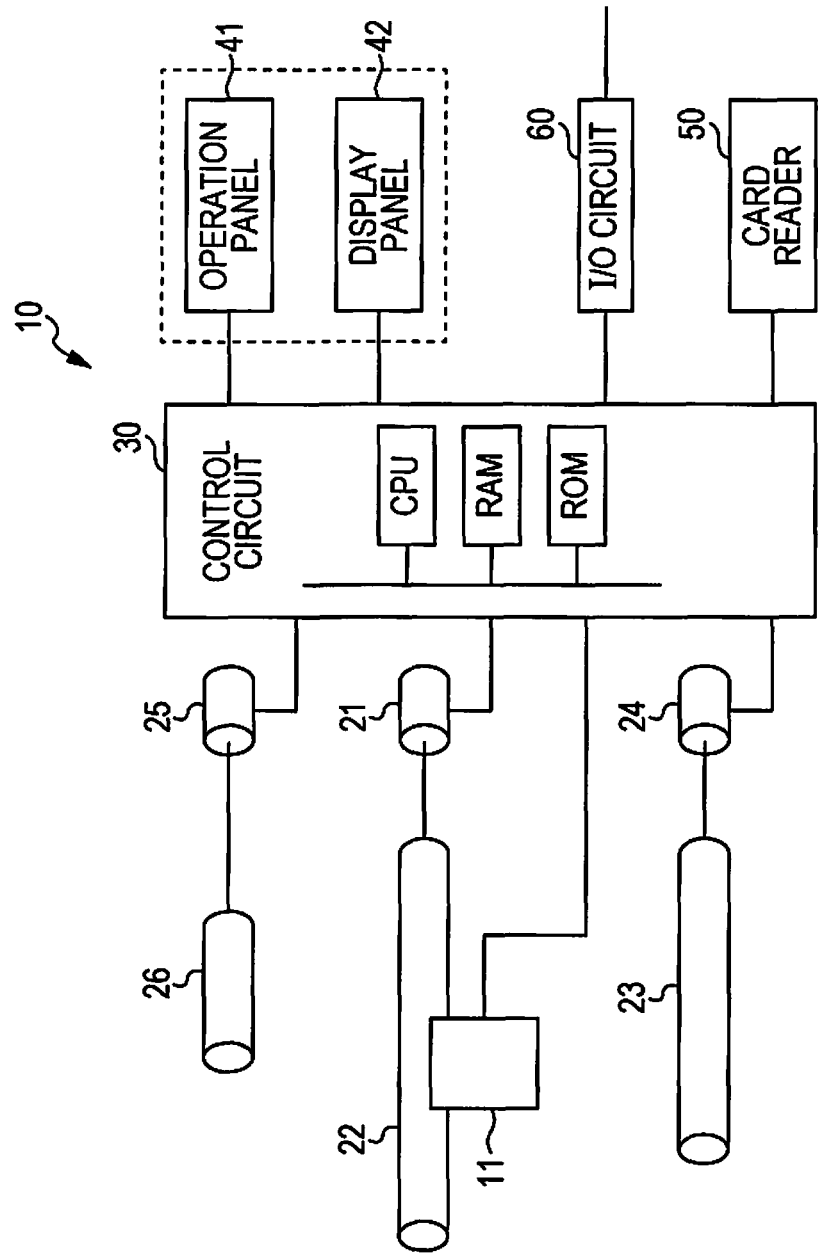
FIG. 1 is a schematic block diagram of an ink jet printer to which the invention is applied.

An embodiment of the invention will be described with reference to the drawings. FIG. 1 is a schematic block diagram of an ink jet printer of the invention. In the drawing, a printing head 11 of a printer 10 ejects four or six color inks, which are supplied from an ink tank, through the nozzles. The printing head 11 is driven with a belt 22 driven by a carriage motor 21 and reciprocates within a predetermined area. A platen 23 is driven by a platen motor 24 and transports paper in cooperation with the reciprocating printing head 11. A feed motor 25 drives a feed roller 26 for feeding paper contained in a predetermined paper stacker. In this case, paper is merely an example print medium and the printing head 11 linearly crosses over the print medium in the width direction.

A control circuit 30 is formed of combined dedicated ICs and includes functional components of a CPU, a ROM, and a RAM. The control circuit 30 controls the printing head 11, the carriage motor 21, the platen motor 24, and the feed motor 25. The control circuit 30, which has an operation panel 41 and a display panel 42 mounted thereon, receives predetermined operations from the user through the operation panel 41 and shows predetermined contents on the display panel 42. Such hardware is collectively called a printing mechanism.

The control circuit 30 is connected to a card reader 50 to receive a detachable memory card and can read data in the memory card and record predetermined data. The control circuit 30 is also connected to an I/O circuit 60 and can communicate with an external device by wired or wireless connection. The control circuit 30 acquires image data files from the external device or the memory card and performs printing by controlling the mechanism in accordance with the data files.

Figure 2:
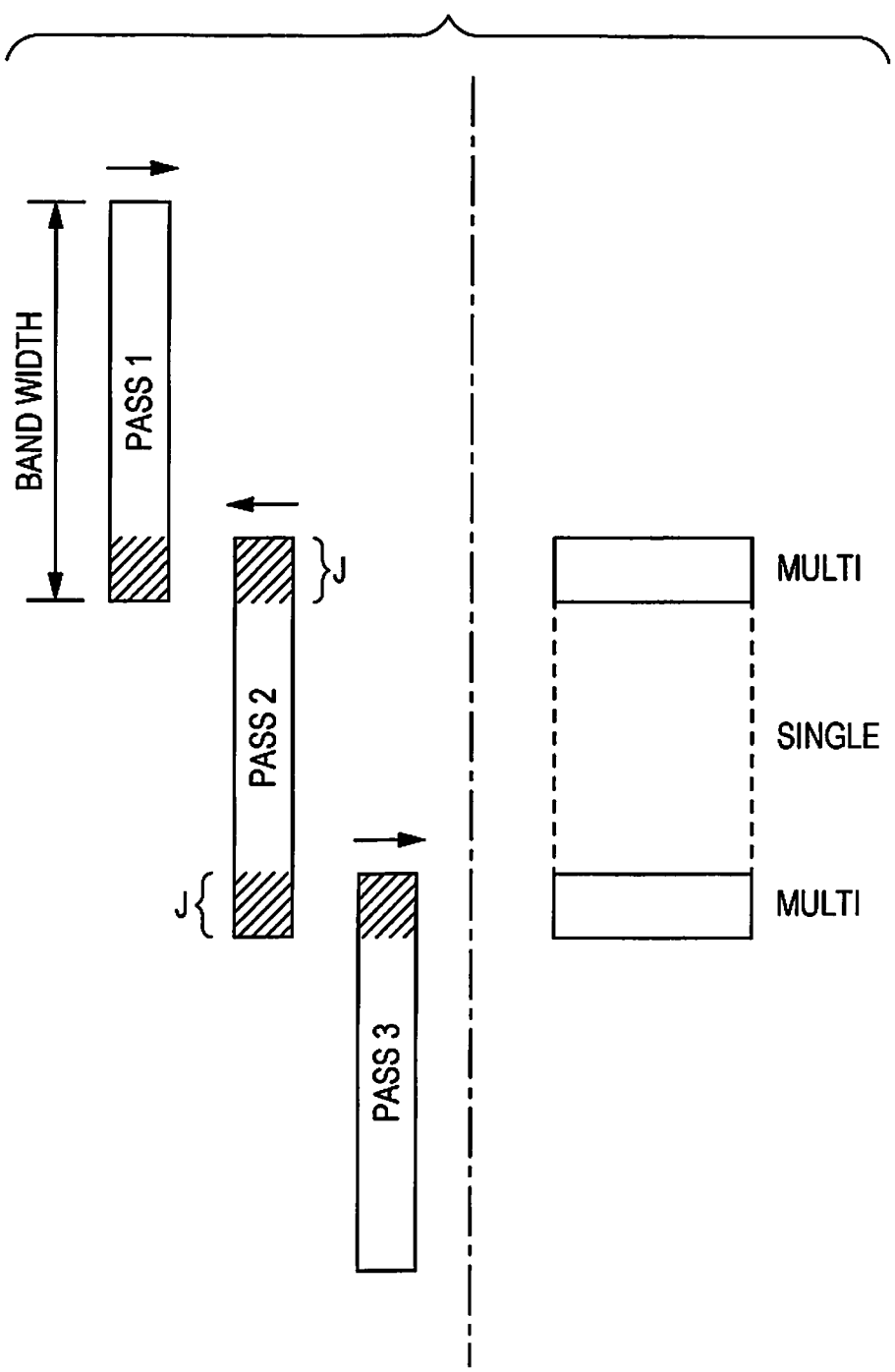
FIG. 2 illustrates a case of multipass printing.

FIG. 2 illustrates a case of multipass printing. Reciprocating the printing head 11 for scanning may result in the occurrence of black streaks or white streaks in regions where passes overlap. In the drawing, a pass 1 moves from the left to the right, a pass 2 moves from the right to the left, and a pass 3 moves from the left to the right, showing overlaps between regions printed by the nozzles of the printing head 11.

The printing head 11 has a line of nozzles and a printable range with the first to last nozzles is called a band width. Multipass printing is performed by using a predetermined number of nozzles upstream and downstream of the nozzle line of the printing head 11. In this example, a joint J is printed in each pass. The joints J are printed in multipass printing, and the other portions are printed by single-pass printing. Since regions to be printed with the predetermined number of nozzles upstream and downstream of the nozzle line are printed by multipass printing, overlaps between the passes are wide even after printing with the reciprocating printing head 11 for scanning, thereby reducing the risk of black streaks and white streaks.

Figure 3:
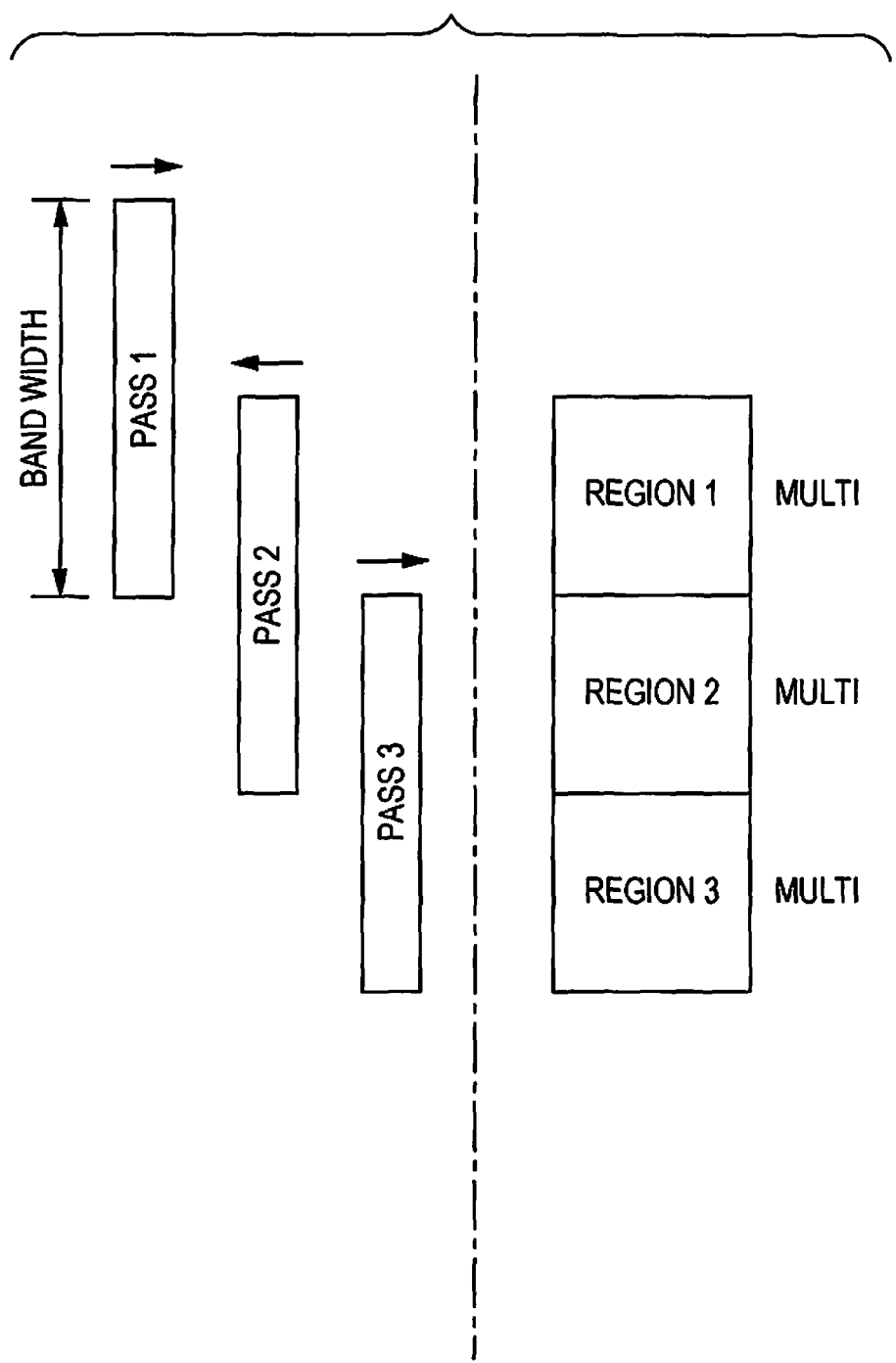
FIG. 3 illustrates another case of multipass printing.

FIG. 3 illustrates another case of multipass printing. Bidirectional printing may result in a difference between the outward and inward printing results. In such multipass printing, the entire printing region is always printed in both outward and inward directions. In particular, a region 1 is printed with the passes 1 and 2, a region 2 is printed with the passes 2 and 3, and a region 3 is printed with the passes 3 and 4. Since the entire region is always printed in both outward and inward directions, uniform printing results are given instead of only the outward or inward printing results, although there is a difference between the outward and inward printing results.

Figure 4:
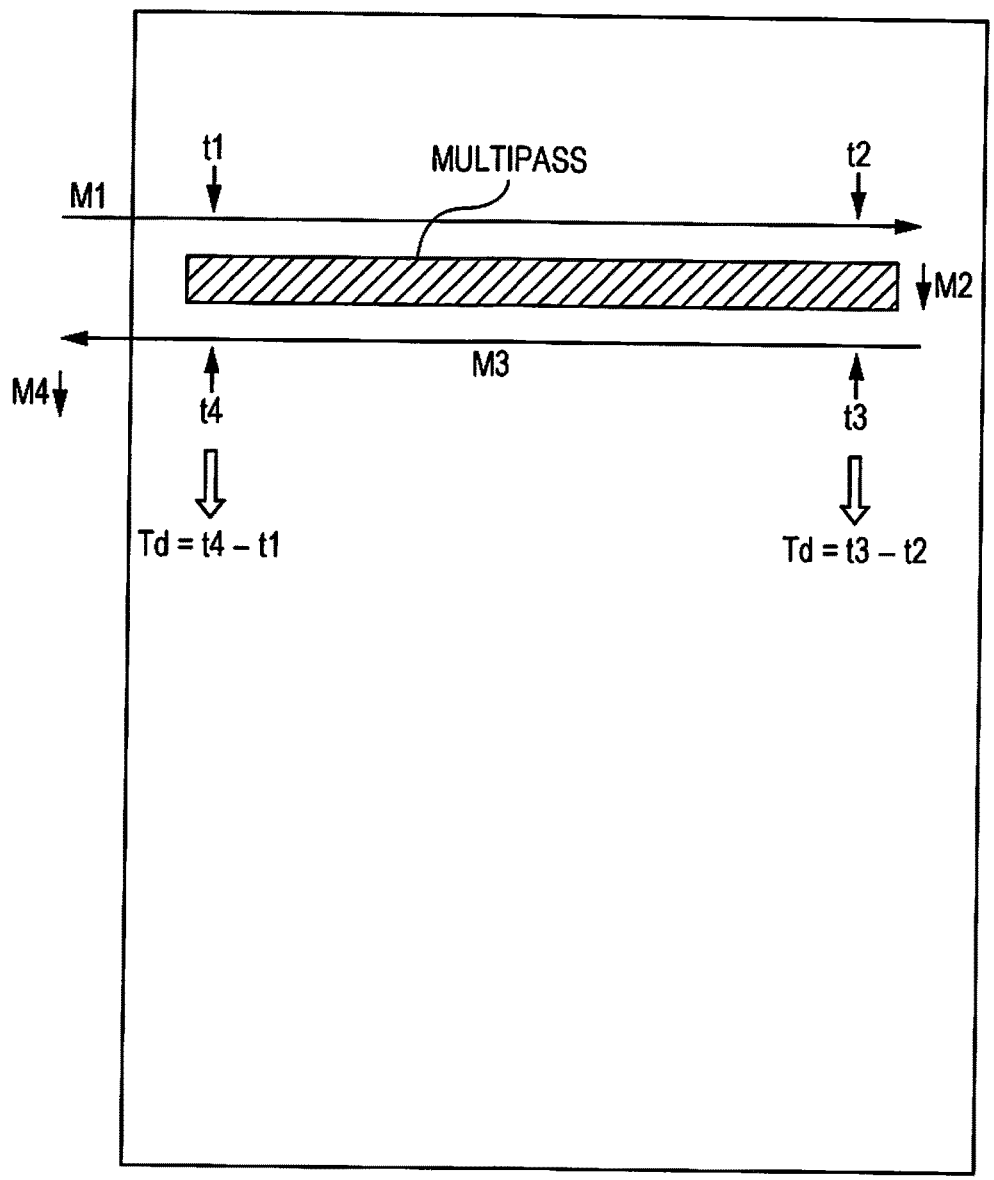
FIG. 4 illustrates a case of the generation of a time gap in multipass printing.

As shown in these examples, multipass printing involves two printing processes with a between-pass time gap, which may cause a change in concentration which has been explained in related art. FIG. 4 illustrates a case of the generation of a time gap in multipass printing. The drawing indicates scanning paths of the printing head 11 in bidirectional printing. In the first step M1, the carriage motor 21 moves the printing head 11 on paper from the left to the right. In the subsequent step M2 while the printing head 11 is on standby at that position, paper is fed by the platen motor 24 by a length smaller than the band width of the printing head 11. In the step M3, the carriage motor 21 moves the printing head 11 on the paper from the right to the left. Thus, in a joint J, a region facing part of the nozzle line of the printing head 11 in the previous scanning faces that part of the nozzle line of the printing head 11 in the current scanning once again, thereby achieving multipass printing.

For the scanning paths in which the printing head 11 moves from the left to the right and from the right to the left, the shaded region in the drawing is printed twice with a time gap therebetween. The printing times are denoted by t1 to t4. In this shaded region, the left region is printed at the time t1 and the time t4, and the time gap Td between two printing processes is (t4−t1). The right region is printed at the time t2 and the time t3, and the time gap Td between two printing processes is (t3−t2). The time gap in the latter case is obviously shorter. As is understandable from this drawing, a time gap can be determined from the positions of the scanning paths and the printing head.

Figure 5:
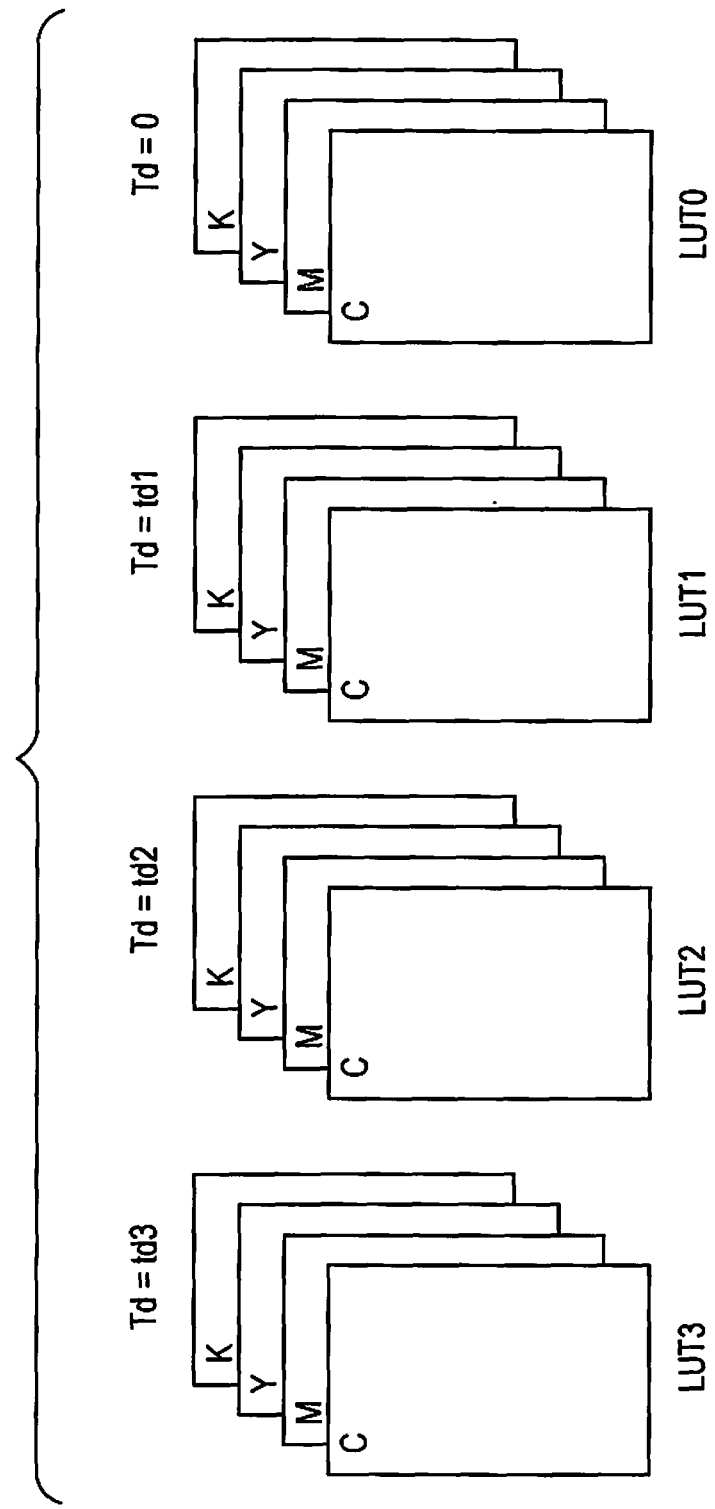
FIG. 5 illustrates color conversion tables corresponding to between-pass time gaps.

FIG. 5 illustrates color conversion tables corresponding to between-pass time gaps. A longer between-pass time gap tends to, but not always, give a darker color. However, a color conversion table for canceling out color change due to a time gap can be made by sampling the time gap and the change in color. Preparing a color conversion table for measuring the printing results without a time gap and the printing results with a time gap and removing the color gap is a way of performing in general calibration or designing color conversion tables and can be achieved by a known method.

In many cases, color change cannot be fixed by adjusting the ink of a single color. In some cases, color change due to a time gap, which is expected to be basically non-linear, can be replaced by linear change within a predetermined allowable color gap, depending on the tendency of the change. Therefore, as illustrated in FIG. 5, color conversion tables LUT3 to LUT1, which reduce the risk of color change, are prepared with time gaps td3, td2, and td1 within which color change can be replaced by linear change. It should be noted that the color conversion table LUT0 is intended for use for multipass printing involving no time gap. Although the drawing of this example shows conversion from RGB data to four-color CMYK data, a six-color ink color conversion table can also be similarly achieved. As described above, not a single color but multiple colors are used for color adjustment to avoid a color gap, unless otherwise specified.

Figure 6:
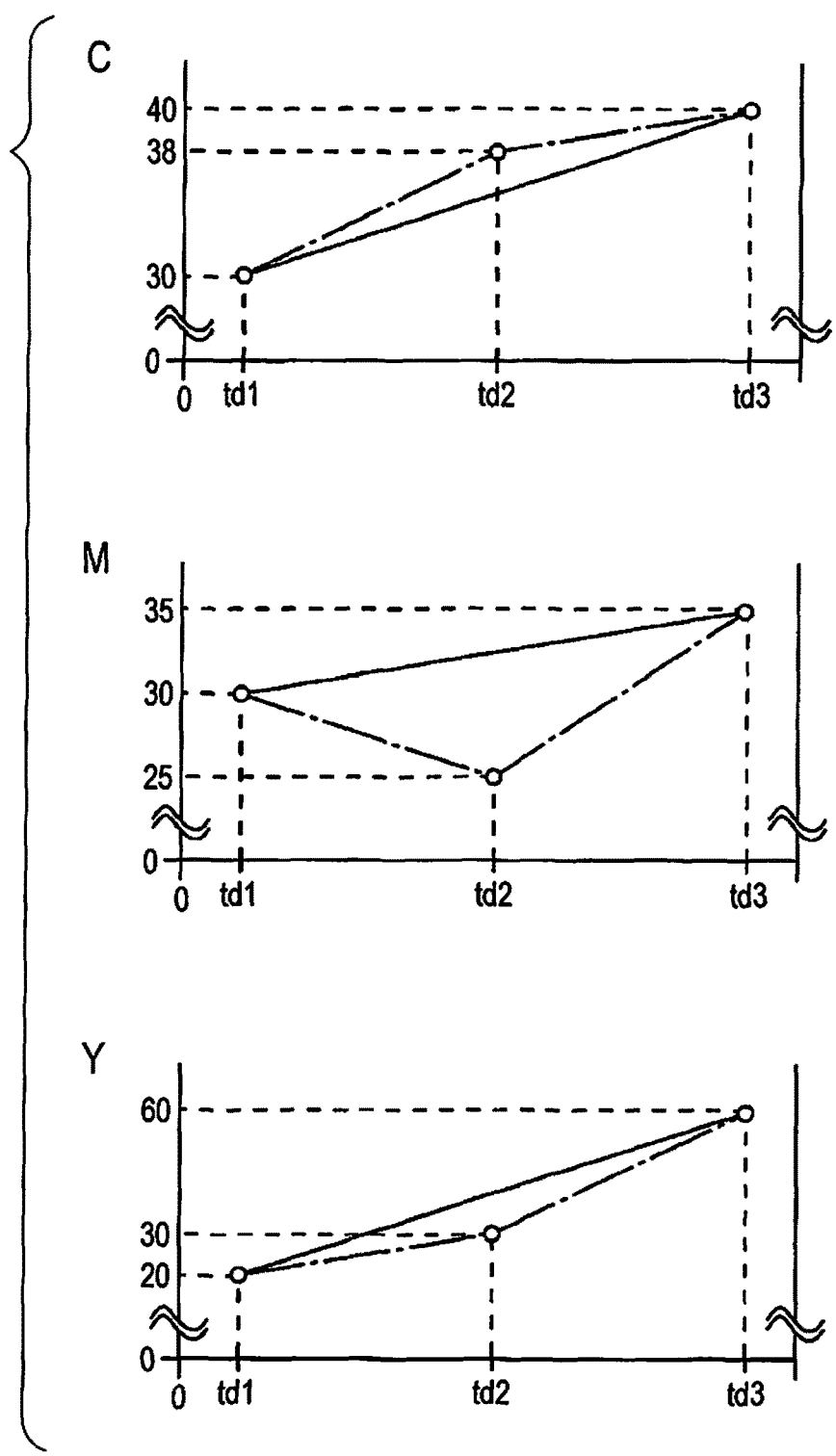
FIG. 6 illustrates a case where interpolation computation is performed using color conversion tables corresponding to a between-pass time gap.

FIG. 6 illustrates a case where interpolation computation is performed using color conversion tables corresponding to between-pass time gaps. Differences in CMY are shown as example color conversion tables prepared to remove a color gap due to the time gaps td3, td2, and td1. First, a comparison between the time gaps td3 and td1 will be explained ignoring td2. In fact, the time gap is any one of td3 to td1 depending on the scanning path of the printing head 11 and the position of the printing head 11. However, in reality, the results of color conversion that avoid a color gap between the time gaps td3 to td1 become linear in some cases. In this case, if there are the color conversion table LUT3 corresponding to the time gap td3 and the color conversion table LUT1 corresponding to the time gap td1, the time gap therebetween can be compensated by linear interpolation using the two color conversion tables LUT3 and LUT1.

However, a time gap, that is, the results of color conversion for avoiding a color gap between td3 to td1 cannot be compensated by linear interpolation in some cases. In this case, the color conversion table LUT2 corresponding to the time gap td2 involving the largest gap is prepared, the time gaps td3 and td2 are compensated using the color conversion tables LUT3 and LUT2 with linear interpolation, and the time gaps td2 and td1 are compensated using the color conversion tables LUT2 and LUT1 with linear interpolation. There are some cases where compensation cannot be performed by linear interpolation even with three color conversion tables. In these cases, the number of color conversion tables may be increased or the gap may be compensated by non-linear interpolation.

The color conversion tables LUT1 to LUT3 correspond to predetermined time gaps in this manner. When a color conversion table is selected depending on the time gap, the converted values of a plurality of color conversion tables are linearly interpolated in accordance with the determined time gaps. FIG. 6 also illustrates non-uniformity in CMY change. Thus, the correction amount (which is a converted value)

differs depending on the ink color in color conversion tables corresponding to the respective time gaps.

The plurality of color conversion tables LUT1 to LUT3 may be prepared in advance or generated as needed. In this case, these color conversion tables may be acquired via a network. Alternatively, two color conversion tables with different time gaps may be prepared and a color conversion table corresponding to a time gap therebetween may be generated.

Figure 7:
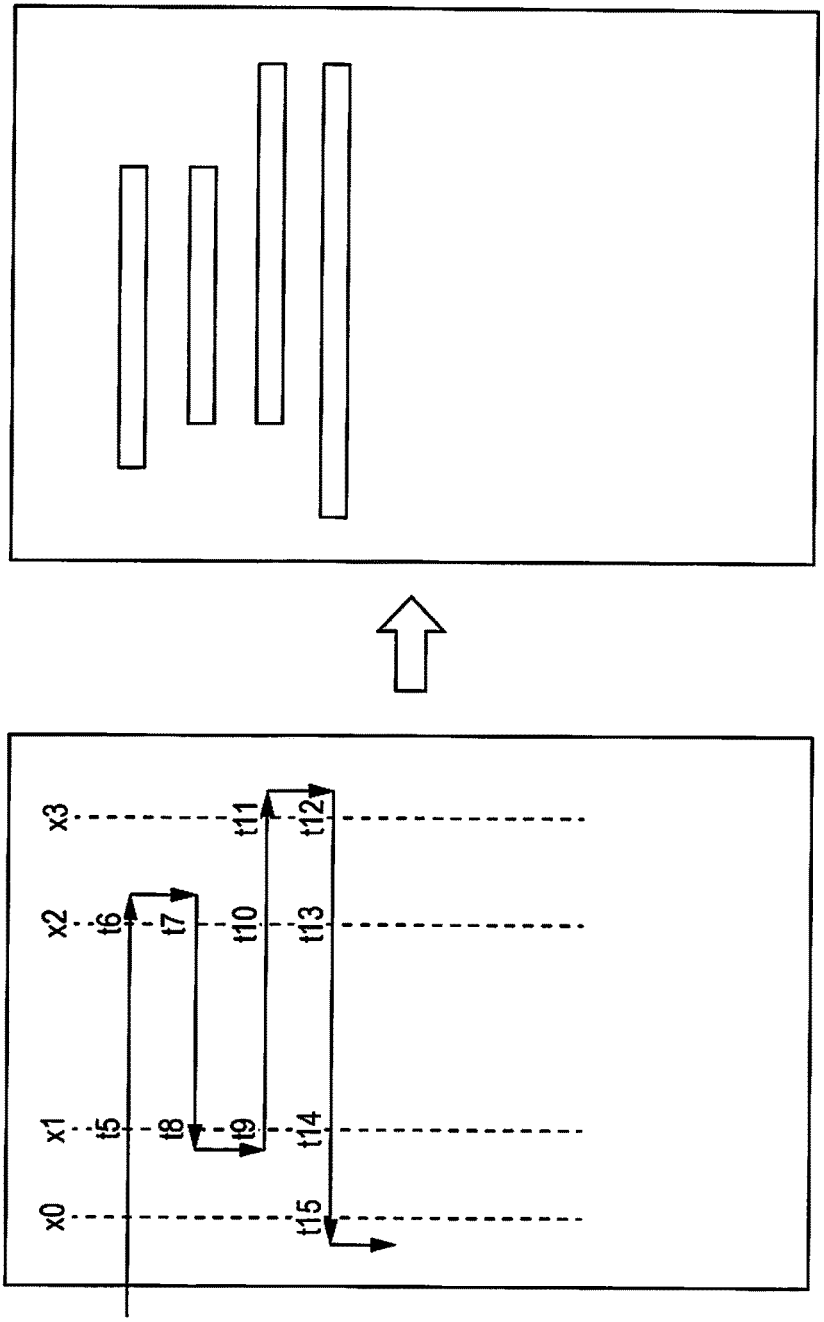
FIG. 7 illustrates a relationship between scanning paths, position data, and time gaps.

FIG. 7 illustrates a relationship between scanning paths, position data, and time gaps. The printing head 11 does not always move from edge to edge on paper. The area in which it reciprocates changes depending on each printing image. Suppose that the printing head 11 moves relatively to paper in accordance with the printing image in the scanning paths illustrated on the left side of FIG. 7. In this case, information on the position of the printing head 11 is associated uniquely with the corresponding time in advance.

Focusing on the positions of x0, x1, x2, and x3 as shown in the drawing, the printing head 11 is in
  the position x1 at the time t5,
  the position x2 at the time t6,
  the position x2 at the time t7,
  the position x1 at the time t8,
  the position x1 at the time t9,
  the position x2 at the time t10,
  the position x3 at the time t11,
  the position x3 at the time t12,
  the position x2 at the time t13,
  the position x1 at the time t14, and
  the position x0 at the time t15.
Regions which are actually printed by multipass printing are illustrated on the right side of FIG. 7. Each portion in the regions printed by multipass printing is associated with the corresponding time gap and position data. In other words, position data on the regions printed by multipass printing is one of the factors determining the time gap. The determined time gap determines the color conversion table which does not cause color change.

Figure 8:
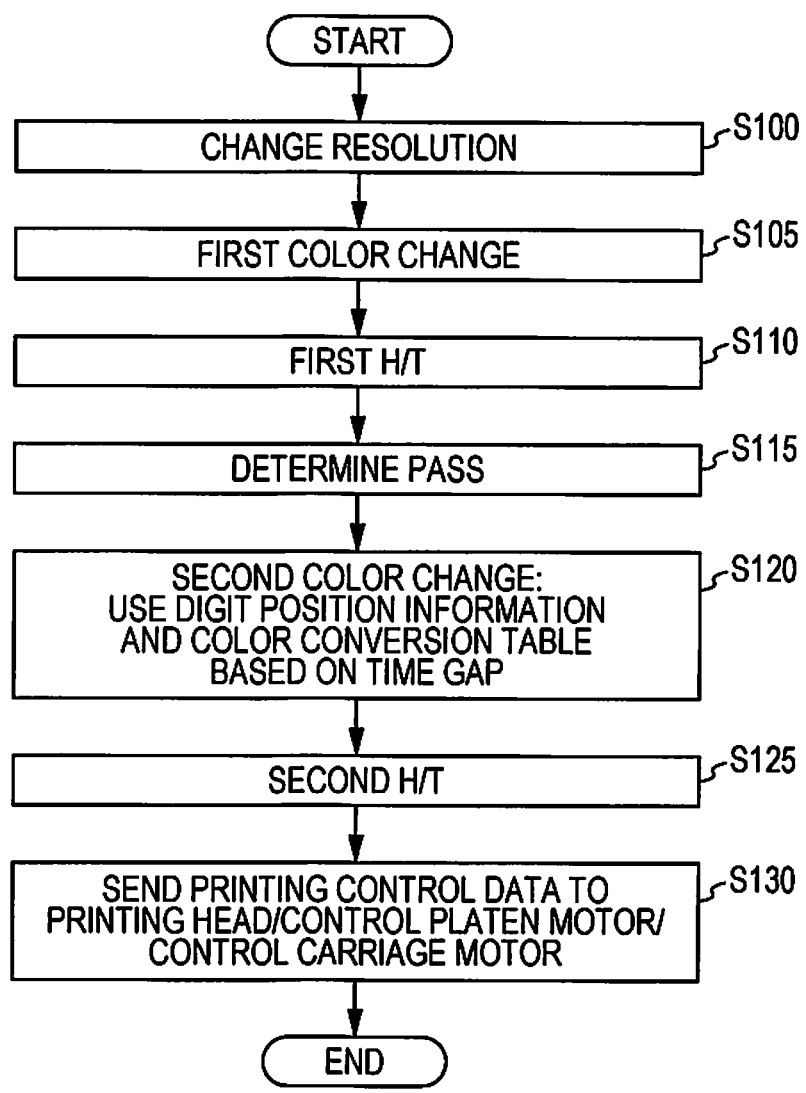
FIG. 8 is a flow chart illustrating a flow of a printing process.
Figure 9:
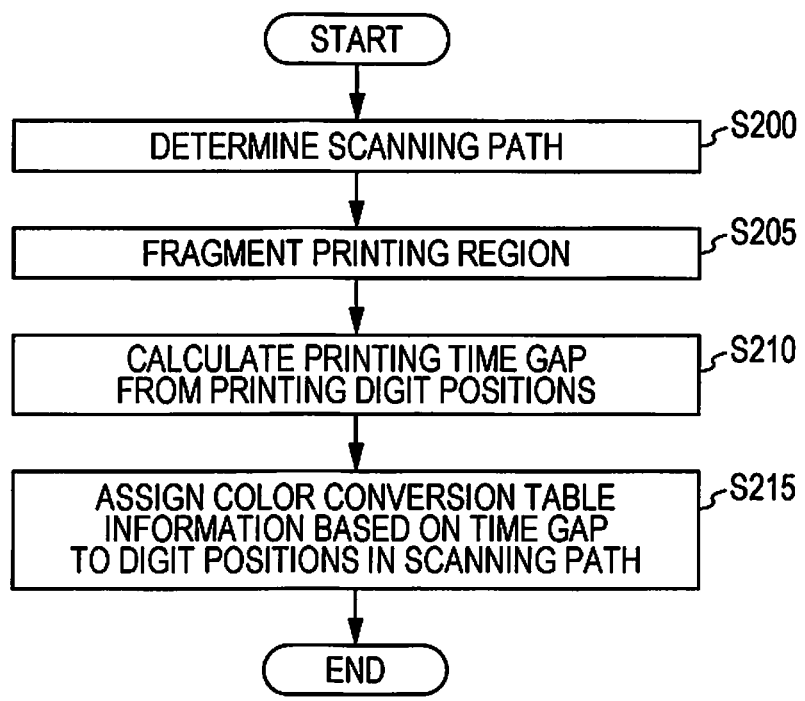
FIG. 9 is a flow chart illustrating a process for determining the time gap from the scanning paths and position data and using the time gap for color conversion.

FIG. 8 is a flow chart of a printing process. FIG. 9 is a flow chart of a process for determining the time gap from the scanning paths and position data and using it for color conversion. In a typical printing process, resolution conversion, color conversion, and halftone are performed in this order. After halftone, printing control data is output to drive the nozzles of the printing head 11. However, when a between-pass time gap occurs, the color conversion table should be changed depending on the position in order to avoid color change as described above. The time gap, which determines the color conversion table used, cannot be specified unless the scanning paths are determined. Accordingly, in this embodiment, resolution conversion is performed in S100, the first color conversion is performed in S105, and the first halftone (H/T) is performed in S110. After the first halftone is performed, a pass determination process is performed to specify the scanning paths of the printing head 11 and a color conversion table is selected in S115.

This process is illustrated in FIG. 9. First, scanning paths are determined in S200. The halftone process determines all the coordinates of ink droplets on paper. Scanning paths of the printing head 11, which cover all these coordinates, are specified. Scanning paths are two-dimensional and achieved by motion in the scanning direction due to the carriage motor 21 and motion in the row direction due to the platen motor 24.

A printing region to undergo multipass printing is then fragmented in S205. In this fragmentation, the scanning direction is divided into about 20 directions, for example. The position of each scanning direction is based on positional information on the corresponding divided region. This is because, although accurate dot-based positions may be used in the regions resulting from multipass printing illustrated on the right side of FIG. 7, regions determined by fragmentation based on the positions are given by the division and use of the same color conversion table in the same region probably does not cause a visible color gap. Not surprisingly, selection of a color conversion table directly from the coordinates of the positions may be performed instead of fragmentation depending on the algorithm of the process.

In S210, a printing time gap is calculated based on printing positions. The first printing time and the second printing time are determined for each region given by fragmentation and the time gap for each region is calculated. After the calculation of the time gap, in S215, the position of the scanning path is associated with information on a color conversion table corresponding to the time gap. Since color conversion tables are not prepared for individual accurate time gaps but are compensated by interpolation as described above, a step of associating time gaps with information on the respective color conversion tables corresponds to a step of specifying a factor required for interpolation (in linear interpolation, specification of two color conversion tables and a ratio).

It should be noted that a step of determining a scanning path in S200 corresponds to a step of acquiring the scanning path of the printing head and position data in multipass printing, and corresponds to the head motion data acquisition unit. Since in the steps S205 to S215, the printing region is fragmented to calculate the printing time gap based on the printing position and the position of the scanning path is associated with information on a color conversion table corresponding to the time gap, a time gap between printing processes with different scanning operations using the scanning path of the printing head and the position data in multipass printing is determined and a color conversion table used for color conversion is selected using the same time gap, achieving the function of the color conversion unit.

Afterwards, the process goes back to the printing process in FIG. 8, and in S120, the second color conversion is performed. In a region to undergo multipass printing, the color conversion table for use in color conversion is switched to that corresponding to the time gap by using information on the pre-specified position of the scanning path and information on the color conversion table. It should be noted that to switch also means to change the ratio used for interpolation computation. In a single pass printing region, such treatment is unnecessary. When the region is fragmented, a time gap between the passes 1 and 2 is calculated for each region, which means that the total number of time gaps is limited. Accordingly, only color conversion tables for the respective time gaps may be generated.

In S125, the second H/T is performed. In S130, printing control data is output to the printing head 11 and the platen motor 24 and the carriage motor 21 are controlled to form a two-dimensional printing image. It should be noted that the printing control method is achieved by the sequential steps in which the above-described treatment is performed, and a printing control program is a flow of commands given to make the CPU (computer) in the control circuit 30 execute the treatment.

It should be understood that the invention should not be limited to the above embodiment. It should be understood by those skilled in the art that the following matters are disclosed as one embodiment of the invention:

Combinations of exchangeable components and structures disclosed in the above embodiment can be changed as appropriate;

Although not shown in the embodiment, any component and structure disclosed in the embodiment can be appropriately replaced by a component or structure in any known technique, and the combination can be changed.

Although not disclosed in the embodiment, those skilled in the art can replace, according to a known technique or the like, any component and structure disclosed in the embodiment with any possible alternative component, structure, or the like and change the combination.

This application claims priority under 35 U.S.C. § 119 to Japanese Patent Application No. 2016-021521, filed Feb. 8 2016. The entire disclosure of Japanese Patent Application No. 2016-021521 is hereby incorporated herein by reference.

What is claimed is:

1. A printing control device that causes a printing device including a printing head linearly crossing over a print medium to perform multipass printing by scanning a region more than once, the printing control device comprising:
    a plurality of color conversion tables;
    a head motion data acquisition unit that acquires position data on the printing head; and
    a color conversion unit that in the multipass printing, using the position data on the printing head, selects at least two color conversion tables of the plurality of color conversion tables, and performs color conversion using the at least two color conversion tables that have been selected, wherein
    the head motion data acquisition unit acquires the position data on at least a first position and a second position of the printing head in one pass for the multipass printing, and
    the color conversion unit selects a first one of the plurality of color conversion tables for the first position using the position data on the first position, and selects a second one of the plurality of color conversion tables, which is different from the first one, for the second position using the position data on the second position, and performs the color conversion by using the first one and the second one of the plurality of color conversion tables that have been selected.

2. The printing control device according to claim 1, wherein
    the head motion data acquisition unit acquires a scanning path of the printing head and the position data in the multipass printing and the color conversion unit selects the at least two of the color conversion tables to be used for the color conversion on the basis of the scanning path of the printing head and the position data.

3. The printing control device according to claim 2, wherein
    the color conversion unit uses the scanning path of the printing head and the position data to determine time gaps for printing between different scanning operations in the multipass printing, and uses the time gaps to select the at least two of the color conversion tables to be used for the color conversion.

4. The printing control device according to claim 3, wherein
    the plurality of color conversion tables correspond to predetermined time gaps, and converted values of the plurality of color conversion tables are linearly interpolated in accordance with the determined time gaps.

5. The printing control device according to claim 1, wherein
    correction amount differs depending on ink color in the plurality of color conversion tables corresponding to the time gaps.

6. The printing control device according to claim 1, wherein
    the plurality of color conversion tables are generated in a predetermined timing.

7. A printing control method that causes a printing device including a printing head linearly crossing over a print medium to perform multipass printing by scanning a region more than once, the method comprising:
    preparing a plurality of color conversion tables;
    acquiring position data on the printing head; and
    in multipass printing, selecting, by using the position data on the printing head, at least two color conversion tables of the plurality of color conversion tables to be used for color conversion, and performing the color conversion using the at least two color conversion tables that have been selected,
    the acquiring including acquiring the position data on at least a first position and a second position of the printing head in one pass for the multipass printing,
    the selecting including selecting a first one of the plurality of color conversion tables for the first position using the position data on the first position, and selecting a second one of the plurality of color conversion tables, which is different from the first one, for the second position using the position data on the second position, and
    the performing including performing the color conversion by using the first one and the second one of the plurality of color conversion tables that have been selected.

8. A non-transitory computer-readable medium storing a printing control program that causes a printing device including a printing head linearly crossing over a print medium to perform multipass printing by scanning a region more than once, the printing control program instructing a computer to
    prepare a plurality of color conversion tables;
    acquire position data on the printing head; and
    in the multipass printing, select, by using the position data on the printing head, at least two color conversion tables of the plurality of color conversion tables to be used for color conversion, and perform the color conversion using the at least two color conversion tables that have been selected,
    the position data on at least a first position and a second position of the printing head in one pass for the multipass printing being acquired,
    a first one of the plurality of color conversion tables being selected for the first position using the position data on the first position, and a second one of the plurality of color conversion tables, which is different from the first one, being selected for the second position using the position data on the second position, and
    the color conversion being performed by using the first one and the second one of the plurality of color conversion tables that have been selected.

* * * * *